United States Patent [19]
Oka

[11] Patent Number: 4,910,740
[45] Date of Patent: Mar. 20, 1990

[54] SECOND HARMONIC GENERATION
[75] Inventor: Michio Oka, Kanagawa, Japan
[73] Assignee: Sony Corporation, Tokyo, Japan
[21] Appl. No.: 308,545
[22] Filed: Feb. 10, 1989
[30] Foreign Application Priority Data Feb. 29, 1988 [JP] Japan .................. 63-046594

[51] Int. Cl.[4] .............................................. H01S 3/10
[52] U.S. Cl. ..................................... 372/22; 372/105
[58] Field of Search .................. 372/22, 105; 307/425, 307/427

[56] References Cited
U.S. PATENT DOCUMENTS

| 3,609,586 | 9/1971 | Danielmeyer | 372/22 |
|---|---|---|---|
| 4,127,827 | 11/1978 | Barry | 372/22 |
| 4,413,342 | 11/1983 | Cohen et al. | 372/22 |
| 4,617,666 | 10/1986 | Liu | 372/22 |
| 4,618,957 | 10/1986 | Liu | 372/22 |
| 4,637,026 | 1/1987 | Liu | 372/22 |
| 4,653,056 | 3/1987 | Baer et al. | 372/22 |
| 4,656,635 | 4/1987 | Baer et al. | 372/22 |
| 4,701,929 | 10/1987 | Baer et al. | 372/22 |
| 4,739,507 | 4/1988 | Byer et al. | 372/22 |
| 4,756,003 | 7/1988 | Baer et al. | 372/22 |
| 4,764,933 | 8/1988 | Kozlovsky et al. | 372/22 |
| 4,809,291 | 2/1989 | Byer et al. | 372/22 |

FOREIGN PATENT DOCUMENTS
4893784 2/1947 Japan .

OTHER PUBLICATIONS
"Stable Intracavity Doubling of Orthogonal Linearly Polarized Mode, in Diode-Pumped Nd:YAG Lasers by Oka"; Optical Society of America, Optic Letters; vol. 13, No. 10, pp. 805-807, Oct. 1988.
"Semiconductor-Laser-Pumped, Mode-Locked, and Frequency-Doubled Nd: YAG Laser by Timothy", Optic Letters, Oct. 1989, vol. 14, No. 13, pp. 677-679.
Journal of Optical Society of America, vol. 3, No. 9, Sep. 1986, pp. 1175-1180.

Primary Examiner—Frank Gonzalez
Attorney, Agent, or Firm—Hill, Van Santen, Steadman & Simpson

[57] ABSTRACT

A second harmonic generator having a non-linear optical crystal element for generating a second harmonic laser light. In this second harmonic generator, a birefringent element is inserted into a resonant optical path of a fundamental wave laser light, whereby the second harmonic laser light emitted as an output laser light is stabilized.

6 Claims, 6 Drawing Sheets

SECOND HARMONIC GENERATION

BACKGROUND OF THE INVENTION

The present invention relates generally to laser light sources and more particularly to a second harmonic generator which can stably generate a second harmonic laser light from a fundamental wave laser light.

A laser light source has been proposed, which can emit a laser light with a short wavelength, by producing a second harmonic laser light having a frequency twice as high as the frequency of a fundamental wave laser light, produced within a resonator of a laser light source (see Official Gazette of Laid-Open Japanese Utility Model Application No. 48-937845).

This kind of laser light source can efficiently emit a second harmonic laser light by phase-matching the second harmonic laser light with the fundamental wave laser light, in a non-linear optical crystal element provided within the resonator containing a laser medium.

For realizing the phase-matching, a phase matching condition of type I or type II has to be established between the fundamental wave laser light and the second harmonic laser light.

The phase-matching condition of type I is based on the principle that, by utilizing an ordinary ray of the fundamental wave laser light, one photon having a frequency twice as high as the fundamental is produced from two photons polarized in the same direction, as expressed in the following equation $$n_{e(2w)} = \tfrac{1}{2}(n_{o(w)} + n_{o(w)}) \tag{1}$$

If the fundamental wave laser light is polarized such that its polarized direction is made coincident with the direction of the non-linear optical crystal element by utilizing a polarizing element such as a polarizing-type beam splitter or the like so as to become incident, in principle, polarized-components (p-wave component and s-wave component) of the fundamental wave laser light emitted from the non-linear optical crystal element can be prevented from being changed in phase, thus making it possible to stably and continuously emit the second harmonic laser light on the basis of the fundamental wave laser light resonating within the resonator. The above-mentioned p-wave component and s-wave component are referred to as intrinsic polarization components.

On the other hand, to realize the phase-matching condition of type II, the phase-matching condition must be established, respectively for two intrinsic polarization components, by introducing two fundamental wave intrinsic polarized lights, which are perpendicular to each other, into a non-linear optical crystal element. That is, the fundamental wave laser light is divided into an ordinary ray and an extraordinary ray within the non-linear optical crystal element, thereby to be phase-matched with the extraordinary ray of the second harmonic laser light as is expressed in the following equation (2)

$$n_{e(2w)} = \tfrac{1}{2}(n_{e(w)} + n_{o(w)}) \tag{2}$$

In the equations (1) and (2), $n_{o(w)}$ and $n_{e(w)}$ respectively depict refractive indexes of the fundamental wave laser light (frequency $f=w$) relative to the ordinary ray and the extraordinary ray, respectively, while $n_{o(2w)}$ and $n_{e(2w)}$ respectively depict refractive indexes of the second harmonic laser light (frequency $f=2w$) relative to the ordinary ray and the extraordinary ray, respectively.

If the second harmonic laser light is produced by utilizing the phase-matching condition of type II, however, each time the fundamental wave laser light repeatedly passes the non-linear optical crystal element, the phase of the intrinsic polarized light of the fundamental wave laser light is changed, resulting in the risk that the second harmonic laser light cannot be generated stably and continuously.

Specifically, if the phases of the perpendicular intrinsic polarized lights (namely, the p-wave component and the s-wave component) are displaced respectively each time the fundamental wave laser light generated by the laser medium repeatedly passes the non-linear optical crystal element by the resonating operation, a stationary state in which the fundamental wave laser lights each increase their light intensities at the respective portions of the resonator efficiently cannot be obtained, thus making it impossible to establish a strong resonation state (namely, a strong standing wave). As a result, the efficiency in which the fundamental wave laser light is converted into the second harmonic laser light is lowered. Also, there is a risk that noise will occur in the second harmonic laser light.

OBJECTS AND SUMMARY OF THE INVENTION

Accordingly, it is an object of the present invention to provide an improved second harmonic generator which can remove the defects encountered with the prior art.

It is another object of the present invention to provide a second harmonic generator in which a fundamental wave laser light can be stably resonated within the resonator under the condition that the phase-matching conditions of the type II are satisfied.

It is a further object of the present invention to provide a second harmonic generator of a simplified configuration which can reliably generate a stable second harmonic laser light.

According to one aspect of the present invention, there is provided a second harmonic generator for generating a second harmonic laser light in which a fundamental wave laser light produced in a laser medium is resonated so as to pass a non-linear optical crystal provided within a resonator, said second harmonic generator comprising:

(a) a birefringent element inserted into a resonant optical path such that while said fundamental wave laser light is rotated in its polarized plane, it reciprocates said resonator, whereby two perpendicular intrinsic polarized lights are set in their fundamental wave modes and an azimuth angle $\theta$ and a phase shift $\Delta$ of said birefringent element are selected so as to prevent energy from being interchanged between said two intrinsic polarized lights of said second harmonic laser light through the generation of the second harmonic laser light.

The above, and other objects, features and advantages of the present invention will become apparent from the following detailed description of the preferred embodiments to be taken in conjunction with the accompanying drawings, throughout which like reference numerals identify like elements and parts.

DETAILED DESCRIPTION OF THE PREFERRED EMBODIMENTS

Now, the present invention will hereinafter be described with reference to the drawings.

Figure 1:
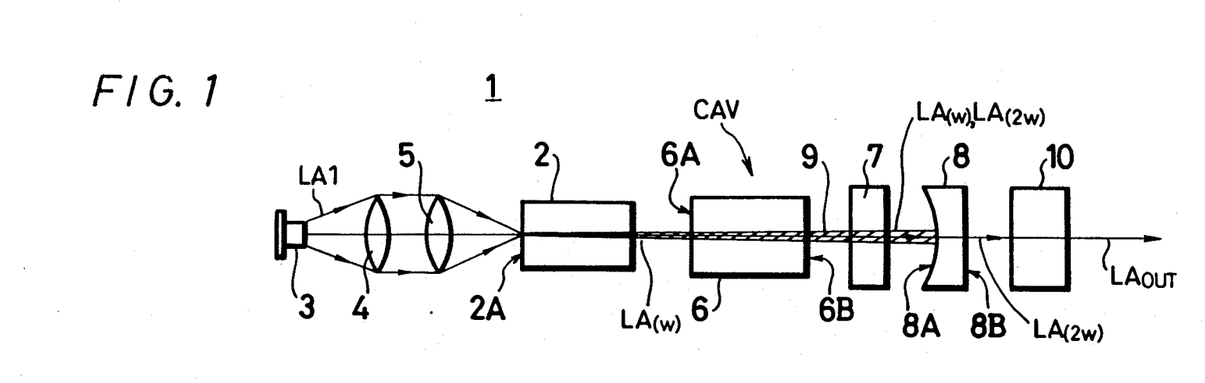
FIG. 1 is a schematic diagram showing an optical path of an embodiment of a second harmonic generator according to the present invention.

FIG. 1 illustrates an overall arrangement of a second harmonic generator. In FIG. 1, reference numeral 1 generally designates a laser light source which includes a laser medium 2 made of, for example, an Nd:YAG as a solid state laser. Excitation laser light LA1 emitted from a semiconductor laser 3 becomes incident on a surface 2A of the laser medium 2 through a collimator lens 4 and an objective lens 5, so that a fundamental wave laser light $LA_{(w)}$ is generated from the laser medium 2.

This fundamental wave laser light $LA_{(w)}$ is sequentially passed through a non-linear optical crystal element 6 made of, for example, KTP (KTiOPO$_4$) and a birefringent element 7 formed of a ¼ wavelength plate such as a crystal plate, reflected from an incident surface 8A of an output mirror 8, and is sequentially passed back through the birefringent element 7, the non-linear optical crystal element 6 and the laser medium 2 and is then reflected on the incident surface 2A of the laser medium 2.

Consequently, the fundamental wave laser light $LA_{(w)}$ resonates so as to reciprocate on a resonant optical path 9 formed between the incident surface 2A of the laser medium 2 and the incident surface 8A of the output mirror 8, thus forming a resonator CAV between the incident surfaces 2A and 8A.

Figure 2:
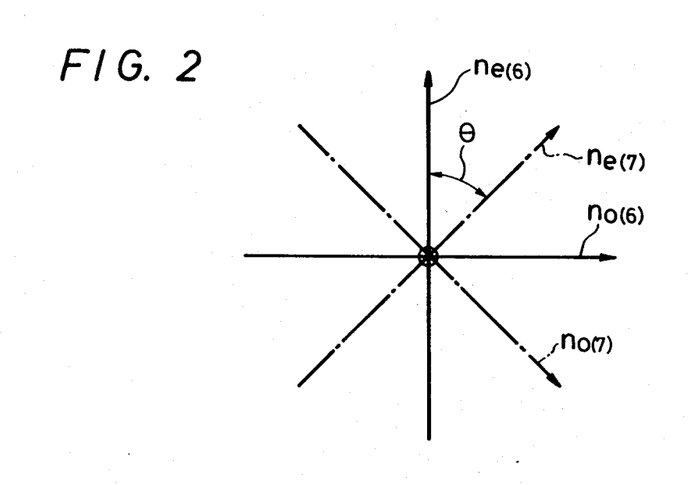
FIG. 2 is a schematic diagram used to explain an azimuth angle of a birefringent element used in the second harmonic generator of the invention shown in FIG. 1.

The birefringent element 7 is located at an optical axis position as shown in FIG. 2, which illustrates a plane perpendicular to the propagation direction of the light, and shows the direction of the extraordinary ray direction refractive index $n_{e(6)}$ of the non-linear optical crystal element 6.

With the above-mentioned arrangement, the fundamental wave laser light $LA_{(w)}$ produces, when passing the non-linear optical crystal element 6 via the resonant optical path 9, a second harmonic laser light $LA_{(2w)}$. This second harmonic laser light $LA_{(2w)}$ is passed through the output mirror 8 and is then transmitted from its light-emitting surface 8B through a filter 10 as an output laser light $LA_{out}$.

Under this condition, the respective rays of light forming the fundamental wave laser light $LA_{(w)}$ are passed through the birefringent element 7 located at the azimuth which is inclined by an azimuth angle $\theta = 45°$ relative to the non-linear optical crystal element 6 so that the powers of the laser lights at the respective parts of the resonator CAV are stabilized to predetermined levels.

The experimental results of the first embodiment described above in connection with FIG. 1 are demonstrated as follows.

Specifically, the non-linear optical crystal element 6 is made of KTP (KTiOPO$_4$) and the birefringent element 7 is formed of a ¼ wavelength plate relative to the wavelength (1.06 μm) of the resonator CAV were inserted into the resonator CAV in which the laser medium 2 formed on the Nd:YAG is excited by means of the excitation semiconductor laser 3.

With this arrangement, under the first condition that the birefringent element 7 is located so as to make its azimuth angle $\theta = 0°$ (namely, under the condition that the optical axis of the birefringent element 7 in the extraordinary ray direction is made coincident with the optical axis of the non-linear optical crystal element 6 in the extraordinary ray direction) and under the second condition that the azimuth angle $\theta = 45°$, the extraordinary ray component $E_{e(w)}$ and the ordinary ray component $E_{o(w)}$ of the fundamental wave laser light $LA_{(w)}$ and the second harmonic laser light $LA_{(2w)}$ were detected by a photo-detector, respectively.

Figure 3A:
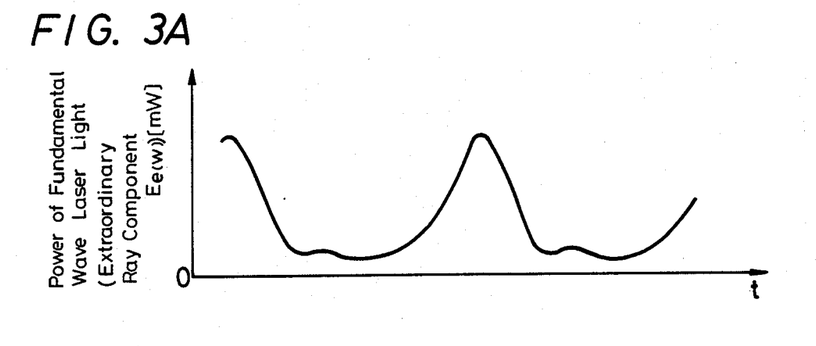
FIGS. 3A to 3C, FIGS. 4A to 4C, FIGS. 5A and 5B and FIGS. 6A and 6B are schematic representations showing experimental results, respectively.
Figure 3B:
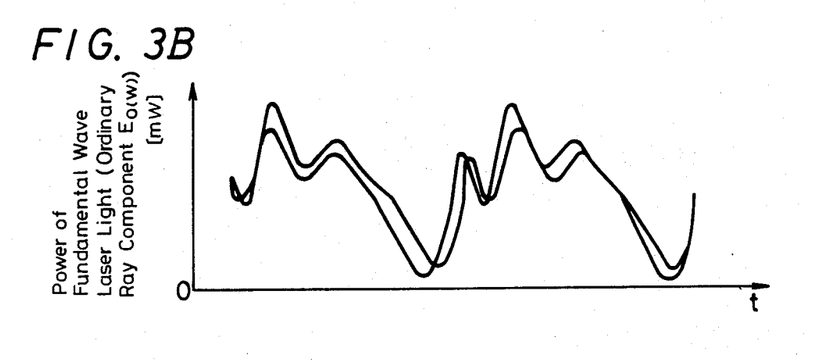

As a result, the extraordinary ray component $E_{e(w)}$ and the ordinary ray component $E_{o(w)}$ of the fundamental wave laser light $LA_{(w)}$ under the first condition (where $\theta = 0°$ is established) demonstrated unstable changes with the time t as shown in FIGS. 3A and 3B.

It should be understood that a characteristic of these changes has a correlation which may result because the extraordinary ray component $E_{e(w)}$ and the ordinary ray component $E_{o(w)}$ caused mode-competition each other.

Figure 3C:
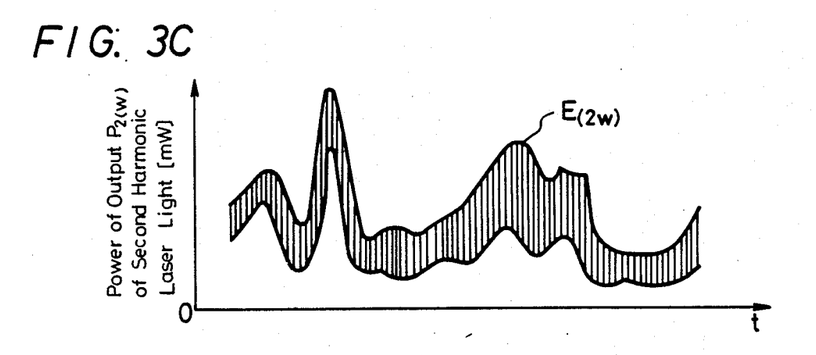

It was apparent that the output $P_{(2w)}$ of the second harmonic laser light $LA_{(2w)}$ (which was generated by the fundamental wave laser light $LA_{(w)}$) of which the power level was unstably changed with time demonstrates the unstable fluctuation, in which the power level was vehemently fluctuated from the high frequency component to the low frequency component, as shown in FIG. 3C.

Figure 4A:
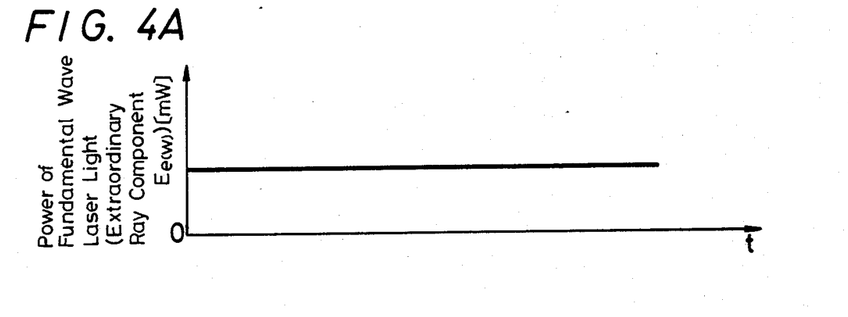
Figure 4B:
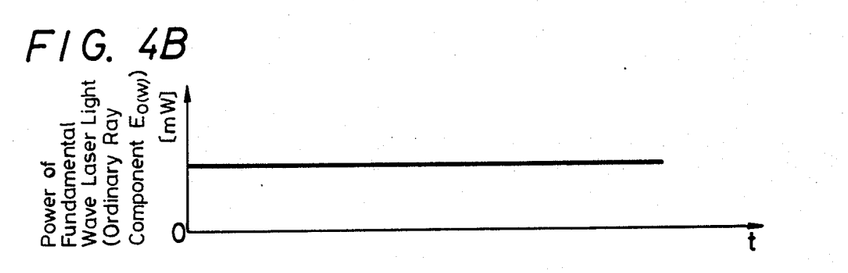
Figure 4C:
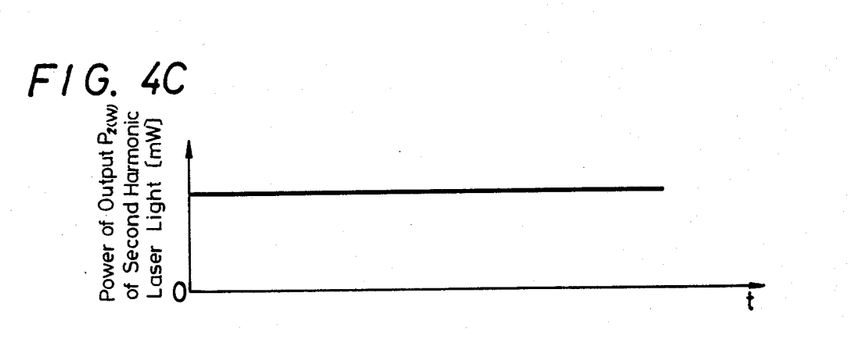

On the other hand, under the second condition that the azimuth angle $\theta$ of the birefringent element 7 is determined by $\theta = 45°$, the extraordinary ray component $E_{e(w)}$ and the ordinary ray component $E_{o(w)}$ of the fundamental wave laser light $LA_{(w)}$ were stabilized so as to demonstrate substantially constant values during the time t as shown in FIGS. 4A and 4B. Accordingly, it became apparent that the output $P_{(2w)}$ of the second harmonic laser light $LA_{(2w)}$ generated by the thus stabilized fundamental wave laser light $LA_{(w)}$ is stabilized substantially to a constant value as shown in FIG. 4C.

Since the fundamental wave laser light $LA_{(w)}$, which resonates through the resonant optical path 9, is not rectilineally polarized by a polarizing element or the like, the fundamental wave laser light $LA_{(w)}$ sets the two perpendicular intrinsic polarized lights into the fundamental wave mode. Further, it becomes a random polarized light which has no correlation to the phase relationship between the two modes.

When the second harmonic laser light $LA_{(2w)}$ is generated within the non-linear optical crystal element 6 by the fundamental wave laser light $LA_{(w)}$, the value of its output $P_{(2w)}$ generally becomes proportional to the product of the output $P_{e(w)}$ of the extraordinary ray component and the output $P_{o(w)}$ of the ordinary ray component of the fundamental wave laser light $LA_{(w)}$ within the non-linear crystal as is given by the following equation expressed as $$P_{(2w)} \alpha d^2 \cdot P_{e(w)} \cdot P_{o(w)} \qquad (3)$$

where $d^2$ is a proportion constant.

However, when the output $P_{(2w)}$ is expressed as the product of the output $P_{e(w)}$ of the extraordinary ray component and the output $P_{o(w)}$ of the ordinary ray component as is seen in the equation (3), a coupling occurs between the two intrinsic polarized lights (namely, the polarized light formed of the extraordinary ray component and the polarized light formed of the ordinary ray component), so that energy is being interchanged between the two polarized lights.

When the energy is interchanged between the two polarized lights, i.e., the extraordinary ray component and the ordinary ray component within the non-linear optical crystal element 6, the outputs $P_{e(w)}$ and $P_{o(w)}$ of the extraordinary ray component and the ordinary ray component are fluctuated with elapse of the time t. As a result, the output $P_{(2w)}$ of the second harmonic laser light generated in the non-linear optical crystal element 6 becomes unstable.

Figure 5A:
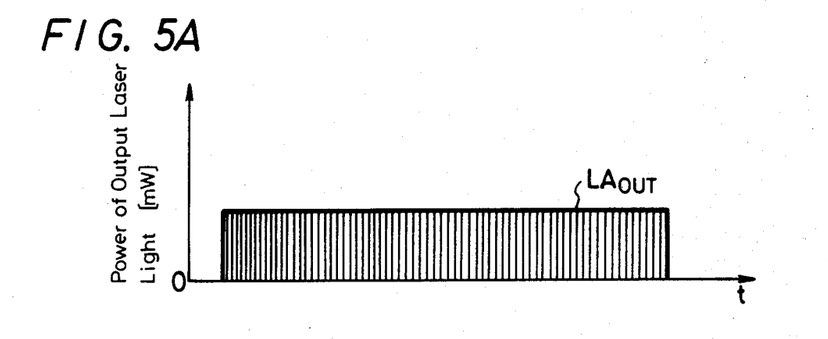
Figure 5B:
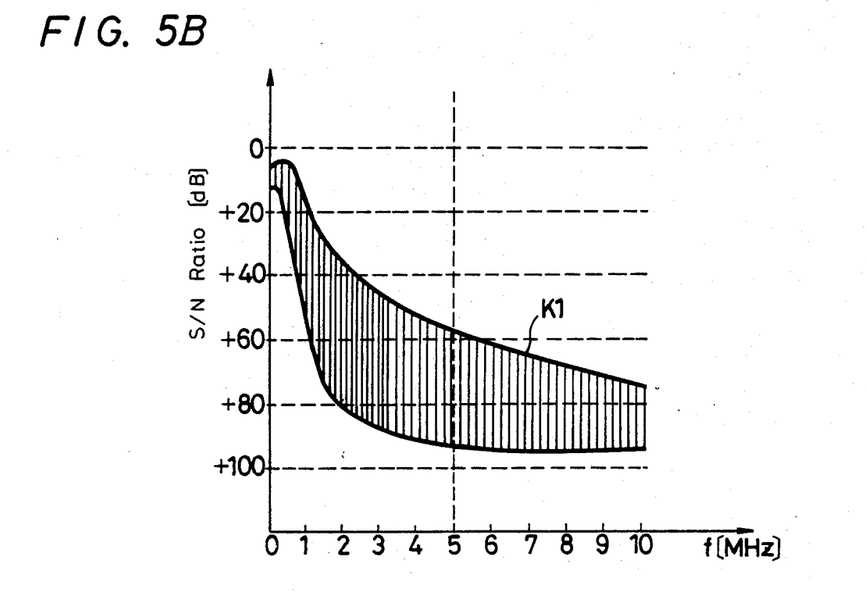

Specifically, in the arrangement where the azimuth angle $\theta$ of the birefringent element 7 is set at $\theta = 0°$, the output laser light $LA_{out}$ contains a noise component of which the energy is too large to be utilized in practice as shown in FIG. 5A. Its noise spectrum contains a noise of about 53 (dB) at a frequency of, for example, about f=5 (MHz) as shown by a curve K1 in FIG. 5B.

Figure 6A:
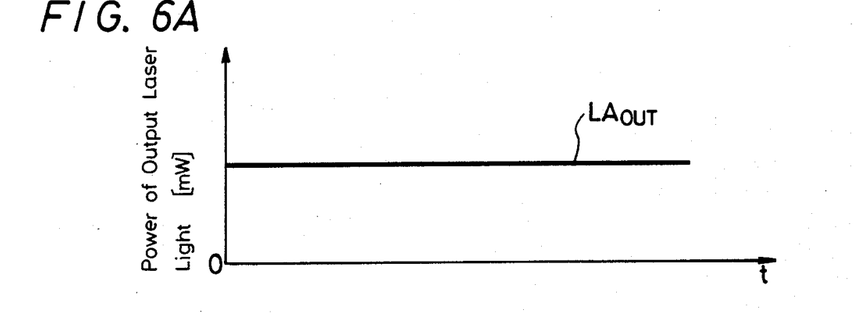
Figure 6B:
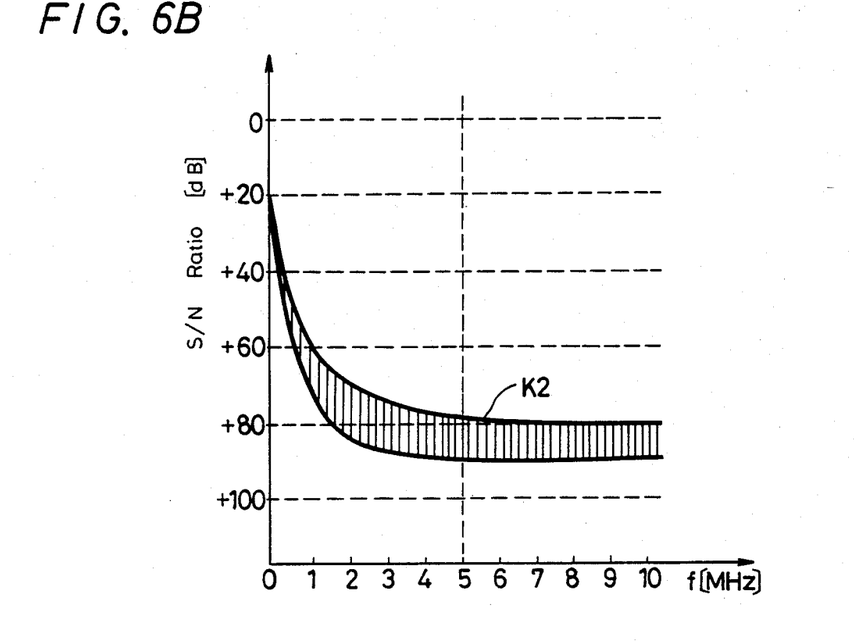

On the other hand, in the arrangement where the azimuth angle $\theta$ of the birefringent element 7 was set at $\theta = 45°$, the output laser light $LA_{out}$ produces a stabilized signal of which the noise component is substantially suppressed in practice, as shown in FIG. 6A. Also, it became apparent that in its noise spectrum, the S/N ratio is improved to about 80 (dB) at a frequency of, for example, f=5 (MHz) as shown by a curve K2 in FIG. 6B.

For the above-mentioned experimental results, according to the arrangement shown in FIG. 1, when the second harmonic laser light $LA_{(2w)}$ is generated within the non-linear optical crystal element 6 under the phase-matching condition of the type II, the azimuth angle $\theta$ of the birefringent element 7 is set at $\theta = 45°$. It is therefore possible to suppress a coupling phenomenon from occurring between the two propagations of the fundamental wave laser light $LA_{(w)}$ which propagates through the resonant optical path 9 of the resonator CAV, stabilizing the output laser light $LA_{out}$ formed of the second harmonic laser light $LA_{(2w)}$.

Consequently, the two perpendicular intrinsic polarized lights within the resonant optical path 9 of the resonator CAV are set in the fundamental wave mode and the fundamental wave laser light $LA_{(w)}$ of the random polarized light, which has no correlation to the phase relationship between the two modes thereof, can be resonated so that an extra polarizer does not have to be provided, thus simplifying the arrangement.

When the second harmonic laser light $LA_{(2w)}$ is produced from the non-linear optical crystal element 6 under the phase-matching condition of type II as seen in the arrangement shown in FIG. 1, the birefringent element 7 is inserted at the position at which the azimuth angle is set $\theta = 45°$ and the resonating operation is stabilized because of the following theoretical reason.

Specifically, within the resonator CAV, a rate equation is established when there exist two modes expressed by the following equations $$\tau_c \frac{dI_1}{dt} = (G_1 - \alpha_1 - \epsilon_1 I_1 - 2\epsilon_2 I_2) I_1 \qquad (4)$$

$$\tau_f \frac{dG_1}{dt} = -(\beta I_1 + \beta_{12} I_2 + 1) G_1 + G_1^0 \qquad (5)$$

$$\tau_c \frac{dI_2}{dt} = (G_2 - \alpha_2 - \epsilon_1 I_2 - 2\epsilon_2 I_1) I_2 \qquad (6)$$

$$\tau_f \frac{dG_2}{dt} = -(\beta I_2 + \beta_{21} I_1 + 1) G_2 + G_2^0 \qquad (7)$$

where $\tau_c$ is the reciprocation time in the resonator CAV, $\tau_f$ the life of phosphor, $\alpha_1$ and $\alpha_2$ the loss coefficients in the two modes, $\epsilon_1$ the loss coefficient caused by the occurrence of the second harmonic of each mode itself, $\epsilon_2$ the loss coefficient caused by the occurrence of a sum frequency between two modes, $\beta$ the saturation parameter, $G_1^0$ and $G_2^0$ the small signal gains in the two modes, respectively, $I_1$ and $I_2$ the light intensities in the two modes, respectively, $G_1$ and $G_2$ the gains in the two modes, respectively, and $\beta_{12}$ and $\beta_{21}$ the cross saturation parameters in the two modes, respectively.

With respect to the above-mentioned rate equation, there is known a paper which points out that a coupling phenomenon between multiplex longitudinal modes causes the resonator to resonate unstably. That is, a rate equation concerning the coupling phenomenon between the multiplex longitudinal modes is disclosed in "Large-Amplitude fluctuations due to longitudinal mode coupling in diode-pumped intracavity-doubled Nd:YAG Lasers" written by T. Baer, published by Journal of Optical Society of America Co., Ltd., Vol. 3, No. 9, September 1986, J. Opt. Soc. Am. B.,pp. 1175 to 1180.

It is considered that the rate equation in this paper can be similarly applied to the two intrinsic polarization modes. Consequently, the equations (4) to (7) are established with respect to the two intrinsic polarization modes.

Of the equations (4) to (7), particularly the equations (4) and (6) include a product term $(-2\epsilon_2 I_1 I_2)$ having the light intensitites $I_1$ and $I_2$ of the respective two intrinsic polarization modes so that the light intensities of the two intrinsic polarization modes within the resonator CAV are generally coupled with each other. Incidentally, the equations (4) and (6) express such a relationship that the light intensity $I_2$ (or $I_1$) is fluctuated with the fluctuation of the light intensity $I_1$ (or $I_2$).

However, the coefficient $\epsilon_2$ of this product term $2\epsilon_2 I_1 I_2$ satisfies $\epsilon_2 = 0$ when the azimuth angle $\theta$ of the birefringent element 7 is selected at $\theta \neq 45°$, i.e., the coefficient $\epsilon_2$ takes other value than 0. This fact can be proved as will be described below. Under this condition, the multiplication term $-2\beta_2 I_1 I_2$ can be erased from the rate equations of the equations (4) and (6) so that the resonating operations expressed by the equations (4) and (6) can be stabilized.

The case where the azimuth angle $\theta$ is selected to be $0°$ will be examined first as an example of the general condition that the azimuth angle $\theta$ is selected so as not to satisfy $\theta \neq 45°$.

Figure 8:
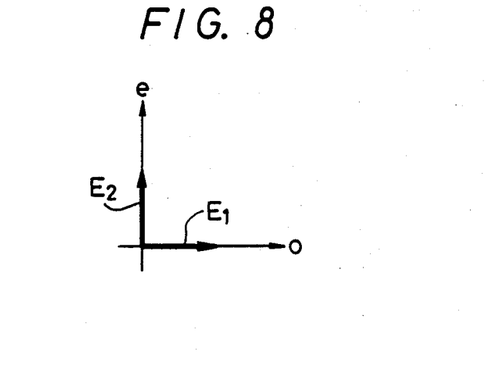
FIGS. 8 and 9 are schematic diagrams illustrating conditions of intrinsic polarization lights presented when the azimuth angle of the birefringent element is selected to be 0 degree and 45 degrees, respectively.

At that time, the light is made incident on the nonlinear optical crystal element 6 in such a manner that electric field vectors $E_1$ and $E_2$ of two intrinsic polarization components thereof are coincident with the ordinary ray axis o and the extraordinary ray axis e of the non-linear optical crystal element 6 as shown in FIG. 8. Accordingly, if the incident electric field vectors $E_1$ and $E_2$ are expressed by Jones vectors where the ordinary ray axis o of the non-linear optical crystal element 6 is taken as the x axis and the extraordinary ray axis e thereof is taken as the y axis, they are expressed as $$E_1 = E_1 \begin{bmatrix} 1 \\ 0 \end{bmatrix} \tag{8}$$

$$E_2 = E_2 \begin{bmatrix} 0 \\ 1 \end{bmatrix} \tag{9}$$

In this case, the Jones vectors are expressed only by the coefficients omitting the phase terms.

As described above, the time-average value $P_{(W)}$ of the power of the fundamental wave laser light $LA_{(w)}$ within the resonator CAV can be expressed by the sum of square of the electric field intensitites $E_1$ and $E_2$ as in the following equation (10)

$$\begin{aligned} P_{(W)} &= (E_1 + E_2)(E_1 + E_2)^* \\ &= E_1 E_1^* + E_2 E_2^* + E_1 E_2^* + E_2 E_1^* \\ &= |E_1|^2 + |E_2|^2 \\ &= P_1 + P_2 \end{aligned} \tag{10}$$

where $(E_1+E_2)^*$, $E_1^*$ and $E_2^*$ are conjugate vectors of $(E_1+E_2)$, $E_1$ and $E_2$, respectively.

Incidentally, in the equation (10), with respect to the time-average values $E_1^*$ and $E_2^*$, if the terms which are to be multiplied are strongly correlated, or in the case of $E_1$ and $E_2$, the time-average values thereof are expressed by the following equations (11) and (12)

$$E_1 E_2^* = |E_1|^2 = P_1 \tag{11}$$

$$E_2 E_1^* = |E_2|^2 = P_2 \tag{12}$$

On the other hand, in the case of $E_1 E_2^*$ and $E_2 E_1^*$, the electric fields $E_1$ and $E_2$ expressed by the multiplication terms represent the respective electric field components of the two perpendicular intrinsic polarization modes. Further, the correlation therebetween is lost by random polarization which has no correlation in the phase relationship between the two modes with the result that time-average values become zero as is expressed in the following equations (13) and (14)

$$E_1 E_2^* = 0 \tag{13}$$

$$E_2 E_1^* = 0 \tag{14}$$

The electric field $E_{(2w)}$ of the second harmonic laser light $LA_{(2w)}$ is expressed, in the case of the phase-matching condition of the type II, by the following equation (15)

$$E_{(2w)} = d \, E_1 E_2 \tag{15}$$

where d is the non-linear conversion efficiency of the non-linear optical crystal element 6.

The time-average value $P_{(2w)}$ of the power of the second harmonic laser light $LA_{(2w)}$ can be expressed by the product of the powers $P_1$ and $P_2$ of the two intrinsic polarization lights as is given by the following equation (16)

$$\begin{aligned} P_{(2w)} &= (d\, E_1 E_2)(d\, E_1^* E_2^*) \\ &= d^2(E_1 E_1^*)(E_2 E_2^*) \\ &= d^2 |E_1|^2 |E_2|^2 \\ &= d^2 P_1 P_2 \end{aligned} \tag{16}$$

Also in this case, the relationships expressed by the equations (11) to (14) are established.

Consequently, the power of the resonator CAV where the azimuth angle $\theta$ is selected at $\theta = 0°$ is presented as a sum of the power $P_1 + P_2$ of the fundamental wave laser light $LA_{(2w)}$ expressed by the equation (10) and the power $d^2 P_1 P_2$ of the second harmonic laser light $LA_{(2w)}$ expressed by the equation (16).

Comparing this relationship with the equations (4) and (6), the light intensitites $I_1$ and $I_2$ in the equations (4) and (6) have the same meaning as those of the powers $P_1$ and $P_2$ in the equations (10) and (16), wherein the equation (4) includes the term of the light intensity $I_1$ (i.e., $(G_1-\alpha_1)I_1$), the term of the light intensity $I_1^2$ (i.e., $-\epsilon_1 I_1^2$) and the product term of $I_1$ and $I_2$ (i.e., $-2\beta_2 I_1 I_2$), while the equation (6) includes the term of $I_2$ i.e., $(G_2-\alpha_2)I_2$, the term of $I_2^2$ i.e., $\epsilon_1 I_2^2$ and the multiplication term of $I_1 I_2$ i.e., $-2\epsilon_2 I_1 I_2$.

Therefore, it should be understood that if $\epsilon_1$ is selected as $\epsilon_1 = 0$ in the sum of the equations (4) and (6), the sum of the equations (4) and (6) has the same term as that of the sum of the equations (10) and (16).

This means that selecting the asimuth angle $\theta$ of the birefringent element 7 at $\theta = 0°$ is equivalent to selecting the constant $\epsilon_1$ and $\epsilon_1 = 0$ in the general condition of the equations (4) and (6). When the azimuth angle $\theta$ is selected at $\theta = 0°$ as described above, however, the product term $-2\epsilon_2 I_1 I_2$ of the respective light intensities $I_1$ and $I_2$ in the two fundamental wave modes cannot be cancelled out because $\epsilon_2 \neq 0$. Accordingly, when the azimuth angle $\theta$ is set at $0°$, the resonating operation of the resonator CAV which is expressed by the rate equations (4) and (6) cannot be stablized.

Figure 9:
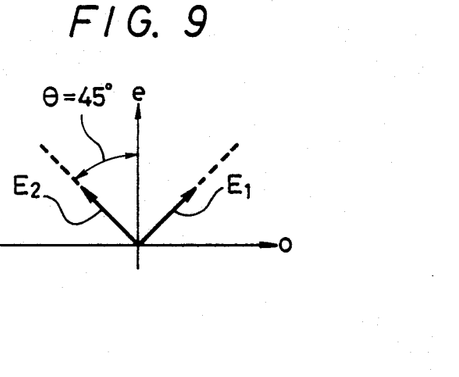

Next, in the arrangement of FIG. 1, when the azimuth angle $\theta$ of the birefringent element 7 is set at $45°$, this means that as shown in FIG. 9, the intrinsic polarization lights $E_1$ and $E_2$ of the fundamental wave laser light $LA_{(w)}$ within the resonator CAV are set at the azimuth angle positions rotated by $\theta = 45°$ relative to the ordinary ray axis o and the extraordinary ray axis e of the non-linear optical crystal element 6. This can be proved by the following equation (17) considering the relationship which will be described below.

As a result, the intrinsic vectors $E_1$ and $E_2$ thereof can be expressed by the Jones vectors that are given by the following equations (17) and (18)

$$E_1 = E_1 \frac{\sqrt{2}}{2} \begin{bmatrix} 1 \\ 1 \end{bmatrix} \tag{17}$$

$$E_2 = E_2 \frac{\sqrt{2}}{2} \begin{bmatrix} 1 \\ -1 \end{bmatrix} \quad (18)$$

Accordingly, the time-average value $P_{(w)}$ of the power $P_{(w)}$ of the fundamental wave laser light $LA_{(w)}$ of the resonator CAV can be expressed by the following equation (19) similarly as described above in connection with the equations (10) to (14).

$$\begin{aligned} P_{(W)} &= (E_1 + E_2)(E_1 + E_2)^* \\ &= E_1 E_1^* + E_2 E_2^* + E_1 E_2^* + E_2 E_1^* \\ &= |E_1|^2 + |E_2|^2 \\ &= P_1 + P_2 \end{aligned} \quad (19)$$

On the other hand, on the basis of the components of the ordinary ray axis o and the extraordinary ray axis e, the electric field $E_{(2w)}$ of the second harmonic laser light $LA_{(2w)}$ generated under the phase-matching condition of the type II is expressed by the following equation (20)

$$\begin{aligned} E_{(2w)} &= d\sqrt{2}/2(E_1 + E_2)\sqrt{2}/2(E_1 - E_2) \\ &= 1/2 d(E_1^2 + E_2^2) \end{aligned} \quad (20)$$

From this equation (20), the time-average value $P_{(2w)}$ of the power $P_{(2w)}$ of the second harmonic laser light $LA_{(2w)}$ can be expressed as $$\begin{aligned} P_{(2w)} &= (1/4)d^2(E_1^2 - E_2^2)(E_1^2 - E_2^2)^* \\ &= (1/4)d^2(E_1^2 E_1^{*2} + E_2 E_2^{*2} - E_1^2 E_2^{*2} - E_2^2 E_1^{*2}) \\ &= (1/4)d^2(|E_1|^4 + |E_2|^4) \end{aligned} \quad (21)$$

where the following equations are established $$E_1^2 E_1^{*2} = |E_1|^4 = P_1^2 \quad (22)$$

$$E_2^2 E_2^{*2} = |E_2|^4 = P_2^2 \quad (23)$$

$$E_1^2 E_2^{*2} = 0 \quad (24)$$

$$E_2^2 E_1^{*2} = 0 \quad (25)$$

Since the terms of $E_1^2 E_1^{*2}$ and $E_2 E_2^{*2}$ of the equation (21) have multiplicating terms of $E_1 E_1^*$ and $E_2 E_2^*$ which are strongly correlated with each other, the time-average value thereof does not become zero but becomes a square of the powers $P_1$ and $P_2$.

On the other hand, the electric fields $E_1 E_2^*$ and $E_2 E_1^*$ are respectively electric field components of two intrinsic polarization modes which are perpendicular to each other. Further, they have no correlation with each other because of random polarizations which have no correlation in phase relationship between the two modes. On the basis of this fact, the time-average values of the term $E_1^2 E_2^{*2}$ and the term $E_2^2 E_1^{*2}$ become zero.

Comparing the sum of the time-average value $P_{(w)}$ of the power $P_{(w)}$ of the fundamental wave laser light $LA_{(w)}$ (the equation (19)) and the time-average value $P_{(2w)}$ of the power $P_{(2w)}$ of the second harmonic laser light $LA_{(2w)}$ (the equation (21)) with the sum of the equations (4) and (6) when the azimuth angle $\theta$ of the birefringent element 7 is set to $\theta = 45°$, it should be understood that if the coefficient $\epsilon_2$ of the multiplication terms of the light intensities $I_1$ and $I_2$ in the equations (4) and (6) is taken so as to satisfy $\epsilon_2 = 0$, the respective terms of the sum of the equations (19) and (20) correspond to the respective terms of the sum of the equations (4) and (6) in a one-to-one relationship.

This means that the azimuth angle $\theta$ of the birefringent element 7 being set at $\theta = 45°$ is equivalent to the coefficient $\epsilon_2$ being set at $\epsilon_2 = 0$ in the equations (4) and (6) each of which is expressed as a general equation. If the above-mentioned conditions can be determined, it is possible to obtain a resonant state without a term expressed by the product of light intensities $I_1$ and $I_2$ of the respective two fundamental wave modes in the equations (4) and (6). Thus, the energy can be prevented from being interchanged through the second harmonic between the light intensities $I_1$ and $I_2$ of the two fundamental wave modes. Therefore, the fundamental wave laser $LA_{(w)}$, accordingly, the second harmonic laser light $LA_{(2w)}$ can be stabilized.

The above-mentioned conditions can be established by selecting as the birefringent element 7 such as birefringent element that its azimuth angle $\theta$ is set at $\theta = 45°$ and that the phase shift $\Delta$ produced when the light passes therethrough is selected at $\Delta = 90°$.

Figure 10:
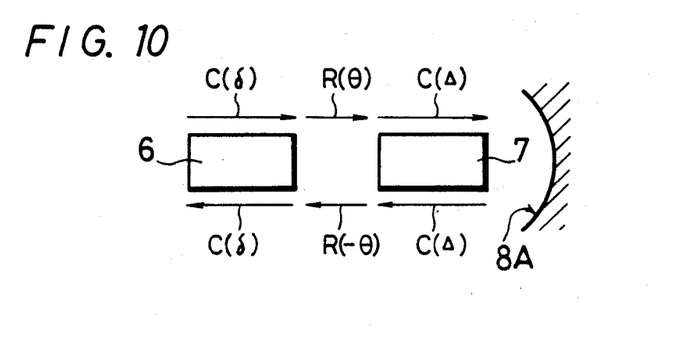
FIG. 10 is a schematic diagram used to explain the polarization condition of the fundamental wave laser light in the resonator.

Specifically, if the fundamental wave laser light $LA_{(w)}$ is displaced in phase by the phase amount $\delta$ by the birefrigence as shown in FIG. 10 when it passes through the non-linear optical crystal element 6, the corresponding polarized state can be expressed by a Jones matrix $C(\delta)$ as in the following equation (26)

$$C(\delta) = \begin{bmatrix} \exp(i\delta/2) & 0 \\ 0 & \exp(-\delta/2) \end{bmatrix} \quad (26)$$

Since the birefringent element 7 is rotated by the azimuth angle $\theta$, the polarized state exerted on the fundamental wave laser light $LA_{(w)}$ is expressed by Jones matrix $R(\theta)$ as follows $$R(\theta) = \begin{bmatrix} \cos\theta & -\sin\theta \\ \sin\theta & \cos\theta \end{bmatrix} \quad (27)$$

Further, the polarized condition that the fundamental wave laser light $LA_{(w)}$ is optically rotated by the phase amount $\Delta$ by the birefringent element 7 can be expressed by Jones matrix $C(\Delta)$ as follows $$C(\Delta) = \begin{bmatrix} \exp(i\Delta/2) & 0 \\ 0 & \exp(-i\Delta/2) \end{bmatrix} \quad (28)$$

Accordingly, the change of the polarized condition that the fundamental wave laser light $LA_{(w)}$ emitted from the laser medium 2 travels sequentially through the non-linear optical crystal element 6 and the birefringent element 7, becomes incident on the incident surface 8A of the output mirror 8, and reflected toward the laser medium 2 through the birefringent element 7 and the non-linear optical crystal element 6 can be expressed by Jones matrix M which is given by the following equation equation $$M = C(\delta)R(\theta)C(\Delta)C(\Delta)R(-\theta)C(\delta) \quad (29)$$

If the equations (26) to (28) are substituted for the equation (29), the matrix M indicating the polarization condition of the corresponding optical system is expressed by the following equation $$M = \begin{bmatrix} \exp(i\delta/2) & 0 \\ 0 & \exp(-i\delta/2) \end{bmatrix} \cdot \qquad (30)$$

$$\begin{bmatrix} \cos\theta & -\sin\theta \\ \sin\theta & \cos\theta \end{bmatrix} \cdot$$

$$\begin{bmatrix} \exp(i\Delta/2) & 0 \\ 0 & \exp(-i\Delta/2) \end{bmatrix} \cdot$$

$$\begin{bmatrix} \exp(i\Delta/2) & 0 \\ 0 & \exp(-i\Delta/2) \end{bmatrix} \cdot$$

$$\begin{bmatrix} \cos\theta & \sin\theta \\ -\sin\theta & \cos\theta \end{bmatrix} \cdot$$

$$\begin{bmatrix} \exp(i\delta/2) & 0 \\ 0 & \exp(-i\delta/2) \end{bmatrix}$$

Computing Jones matrixes of the second to fifth terms on the right side of the equation (29) as matrix M1 yields the following equation $$\begin{aligned} M1 &= R(\theta)C(\Delta)C(\Delta)R(-\theta) \qquad (31) \\ &= R(\theta)C(2\Delta)R(-\theta) \\ &= \begin{bmatrix} \cos\theta & -\sin\theta \\ \sin\theta & \cos\theta \end{bmatrix} \cdot \\ &\phantom{=}\begin{bmatrix} \exp(i\Delta) & 0 \\ 0 & \exp(-i\Delta) \end{bmatrix} \cdot \\ &\phantom{=}\begin{bmatrix} \cos\theta & \sin\theta \\ -\sin\theta & \cos\theta \end{bmatrix} \\ &= \begin{bmatrix} \cos\theta & -\sin\theta \\ \sin\theta & \cos\theta \end{bmatrix} \cdot \\ &\phantom{=}\begin{bmatrix} \exp(i\Delta)\cos\theta & \exp(i\Delta)\sin\theta \\ -\exp(-i\Delta)\sin\theta & \exp(-i\Delta)\cos\theta \end{bmatrix} \\ &= \begin{bmatrix} \exp(i\Delta)\cos^2\theta + \exp(-i\Delta)\sin^2\theta \\ (\exp(i\Delta) - \exp(-i\theta))\sin\theta\cos\theta \end{bmatrix} \cdot \\ &\phantom{=}\begin{bmatrix} (\exp(i\Delta) - \exp(-i\Delta))\sin\theta\cos\theta \\ \exp(-i\Delta)\cos^2\theta + \exp(i\Delta)\sin^2\theta \end{bmatrix} \\ &= \begin{bmatrix} \cos\Delta + i\sin\Delta\cos2\theta & i\sin\Delta\sin2\theta \\ i\sin\Delta\sin2\theta\cos\Delta & -i\sin\Delta\cos2\theta \end{bmatrix} \end{aligned}$$

Substituting the computed result for the equation (29) yields the following equation $$\begin{aligned} M &= C(\delta) \cdot M1 \cdot C(\delta) \qquad (32) \\ &= \begin{bmatrix} \exp(i\delta/2) & 0 \\ 0 & \exp(-i\delta/2) \end{bmatrix} \\ &\phantom{=}\begin{bmatrix} \exp(i\delta/2)(\cos\Delta + i\sin\Delta\cos2\theta) \\ \exp(i\delta/2)\,i\sin\Delta\sin2\theta \end{bmatrix} \\ &\phantom{=}\begin{bmatrix} \exp(-i\delta/2)\sin\Delta\sin2\theta \\ \exp(-i\delta/2)(\cos\Delta - i\sin\Delta\cos2\theta) \end{bmatrix} \\ &= \begin{bmatrix} \exp(i\delta)(\cos\Delta + i\sin\Delta\cos2\theta) \\ i\sin\Delta\sin2\theta \end{bmatrix} \\ &\phantom{=}\begin{bmatrix} i\sin\Delta\sin2\theta \\ \exp(-i\delta)(\cos\Delta - i\sin\Delta\cos2\theta) \end{bmatrix} \end{aligned}$$

Then, the matrix M expressing the polarization condition is expressed as $$M = \begin{bmatrix} A & B \\ C & D \end{bmatrix} \qquad (33)$$

and an intrinsic value $\lambda$ relative to the intrinsic vector X is calculated as follows $$MX = \lambda X \qquad (34)$$

The intrinsic value satisfying the above-mentioned equation (34) should satisfy the determinant expressed as $$\begin{bmatrix} A - \lambda & B \\ C & D - \lambda \end{bmatrix} = 0 \qquad (35)$$

If this determinant is developed, it is sufficient to solve the quadratic equation with respect to as in the following equations (36) and (37)

$$(A-\lambda)(D-\lambda) - BC = 0 \qquad (36)$$

$$\lambda^2 - (A+D)\lambda + AD - BC = 0 \qquad (37)$$

The solution of the equation (37) is presented as $$\lambda = \frac{(A + D) \pm \sqrt{(A + D)^2 - 4(AD - BC)}}{2} \qquad (38)$$

A+D can be simplified from the equations (32) and (33) as $$\begin{aligned} A + D &= \exp(i\delta)(\cos\Delta + i\sin\Delta\cos2\theta) + \exp(-i\delta) \qquad (39) \\ &\phantom{=} (\cos\Delta - i\sin\Delta\cos2\theta) \\ &= 2\cos\delta\cos\Delta + i\sin\Delta\cos2\theta(2i\sin\delta) \\ &= 2(\cos\delta\cos\Delta - \sin\delta\sin\Delta\cos2\theta) \end{aligned}$$

Also, AD−BC can be simplified as follows $$AD - BC = \cos^2\Delta + \sin^2\Delta\cos^22\theta + \sin^2\Delta\sin^22\theta = 1 \qquad (40)$$

Therefore, substituting the equations (39) and (40) for the equation (38) yields the intrinsic value $\lambda$ expressed as $$\lambda = -(\cos\delta\cos\Delta - \sin\delta\sin\Delta\cos2\theta) \pm \qquad (41)$$

$$\sqrt{(\cos\delta\cos\Delta - \sin\delta\sin\Delta\cos2\theta)^2 - 1}$$

If the component x of the intrinsic vector X is selected at x=1, the intrinsic vector X can be expressed by the following equation (42)

$$X = \begin{bmatrix} x \\ y \end{bmatrix} = \begin{bmatrix} 1 \\ -\dfrac{A-\lambda}{B} \end{bmatrix} \qquad (42)$$

In the arrangement of FIG. 1, the azimuth angle $\theta$ of the birefringent element 7 is set at $\theta = 45°$ and the phase angle $\Delta$ of the birefringent element 7 is selected at $\Delta = 90°$.

Accordingly, if the following equations $$\theta = 45° \qquad (43)$$

$$\Delta = 90° \qquad (44)$$

are put into the equations (32) and (33), then the matrix M expressing the polarization condition is presented as $$M = \begin{bmatrix} A & B \\ C & D \end{bmatrix} = \begin{bmatrix} 0 & i \\ i & 0 \end{bmatrix} \qquad (45)$$

Also, from the equation (41), the intrinsic value is presented as $$\lambda = \pm i$$

Thus, the intrinsic vector X can be finally obtained as $$X = \begin{bmatrix} x \\ y \end{bmatrix} = \begin{bmatrix} 1 \\ \pm 1 \end{bmatrix} \qquad (47)$$

From the above-mentioned results, as described above in connection with the equations (43) and (44), the azimuth angle $\theta$ is selected to be 45° and the phase amount $\Delta$ is selected to be 90°. This means that when the fundamental wave laser light $LA_{(w)}$ becomes incident on the non-linear optical crystal element 6 from the laser medium 2, its intrinsic polarized vectors $E_1$ and $E_2$ within the resonator CAV are rotated by 45° relative to the ordinary ray axis o and the extraordinary ray axis e of the on-linear optical crystal element 6.

As a result of the examinations from the theoretical standpoint, it should become apparent that the fundamental wave laser light $LA_{(w)}$ of the resonator CAV, accordingly, the second harmonic laser light $LA_{(2w)}$ can be stabilized by specifying the azimuth angle $\theta$ of the birefringent element 7 as $\theta = 45°$.

Figure 7:
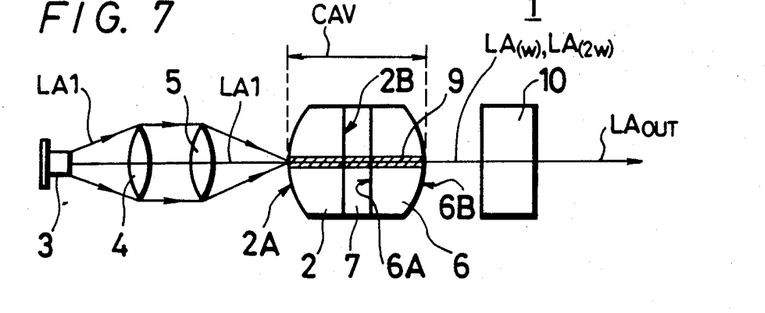
FIG. 7 is a schematic diagram showing an optical path of another embodiment of the second harmonic generator according to the present invention.

FIG. 7 shows a second embodiment of the second harmonic generator according to the present invention, in which like parts corresponding to those of FIG. 1 are marked with the same reference.

As FIG. 7 shows, in the resonator CAV, there are provided the birefringent element 7 and the non-linear optical crystal element 6 which are sequentially and integrally mounted to the light-emitting surface 2B of the laser medium 2 (formed of the solid state laser of Nd:YAG laser configuration) which receives on its incident surface 2A the excitation laser light LA1 emitted from the excitation semiconductor laser 3 through the collimator lens 4 and the objective lens 5.

In this embodiment, a reflecting surface is formed on the light-emitting surface 6B of the non-linear optical crystal element 6, whereby the resonant optical path 9 through which the fundamental wave laser light $LA_{(w)}$ travels is formed between the incident surface 2A of the laser medium 2 and the light-emitting surface 6B of the non-linear optical crystal element 6. Thus, the second harmonic laser light $LA_{(2w)}$ generated within the non-linear optical crystal element 6 is transmitted as the output laser light $LA_{out}$.

Since the optical axis of the birefringent element 7 in the extraordinary ray direction is displaced from the optical axis of the non-linear optical element 6 in the extraordinary ray direction so as to select the azimuth angle $\theta = 45°$ as described in connection with FIG. 2, it is possible to obtain the output laser light $LA_{out}$ formed of the stable second harmonic laser light $LA_{(2w)}$ similarly as described before in connection with FIG. 1.

In addition, according to the arrangement of FIG. 7, since the laser medium 2, the birefringent element 7 and the non-linear optical crystal element 6 are sequentially and closely laminated as one body, it is possible to obtain a laser light source whose overall arrangement can be more miniaturized.

While the fundamental wave laser light $LA_{(w)}$ is stabilized by setting the ¼ wavelength plate provided as the birefringent element 7 at the azimuth angle position in which the birefringent element 7 is rotated by the azimuth angle $\theta = 45°$ in the above-mentioned embodiments, the birefringent element 7 is not limited to the above-mentioned one but can take various modifications and variations. That is, if the birefringent element 7 can provide such azimuth angle $\theta$ and phase shift $\Delta$ that can avoid the fluctuation expressed by the product of the light intensities of the two polarized lights in practice, as expressed in the equations (4) and (6), by changing the polarization state during the interval in which the fundamental wave laser light $LA_{(w)}$ travels through the non-linear optical crystal element 6 and the birefringent element 7, reflected on the incident surface 8A of the output mirror 8 and returns, the birefringent element is not limited to the ¼ wavelength plate but various kinds of birefringent elements can be used.

According to the present invention, as set forth above, since the fundamental wave laser light is formed of two intrinsic polarization modes which are perpendicular to each other in the resonant optical path of the resonator and resonated under the condition of the random polarization state which has no correlation in phase relationship between the two modes, and the energy is prevented from being interchanged between the two intrinsic polarized lights perpendicular to each other through the generation of the second harmonic, the second harmonic laser light which is sufficiently stable in practice can be generated by the simplified arrangement with ease.

It should be understood that the above descriptions presented by way of example on the preferred embodiments of the invention and it will be apparent that many modifications and variations thereof could be effected by one with ordinary skill in the art without departing from the spirit and scope of the novel concepts of the invention so that the scope of the invention should be determined only by the appended claims.

It is claimed:

1. A second harmonic generator for generating a second harmonic laser light comprising:
- an excitation laser;
- a laser medium for generating a fundamental wave laser light by the light of the excitation laser, said fundamental wave laser light having an ordinary ray element and an extraordinary ray element;
- a non-linear optical crystal element provided within an optical resonator formed by first and second mirrors for generating a second harmonic laser light by the fundamental wave laser light reciprocated in the optical resonator, said optical resonator holding the fundamental wave laser light in unpolarized status;
- a birefringent element further provided within the optical resonator, with the optical axis in the extraordinary ray direction being inclined at a specific azimuth angle against the optical axis of the non-linear optical crystal element in the extraordinary ray direction;

whereby, the output of the second harmonic laser light emitted from the resonator is stabilized.

2. A second harmonic generator according to claim 1, in which one of the mirrors is formed onto the end of the laser medium.

3. A second harmonic generator according to claim 1, in which the azimuth angle between the non-linear optical crystal element and the birefringent element is 45°.

4. A second harmonic generator according to claim 1, in which the non-linear optical crystal element and birefringent element are combined together.

5. A second harmonic generator according to claim 1, in which a laser medium, a non-linear optical crystal element and the birefringent element are combined with each other.

6. A second harmonic generator according to claim 5, in which the first and second mirrors are formed onto the ends of the combination.

* * * * *